W. E. BENNETT.
HARVESTER REEL AND SUPPORT THEREFOR.
APPLICATION FILED MAY 16, 1910.
1,013,636.
Patented Jan. 2, 1912.
2 SHEETS—SHEET 1.
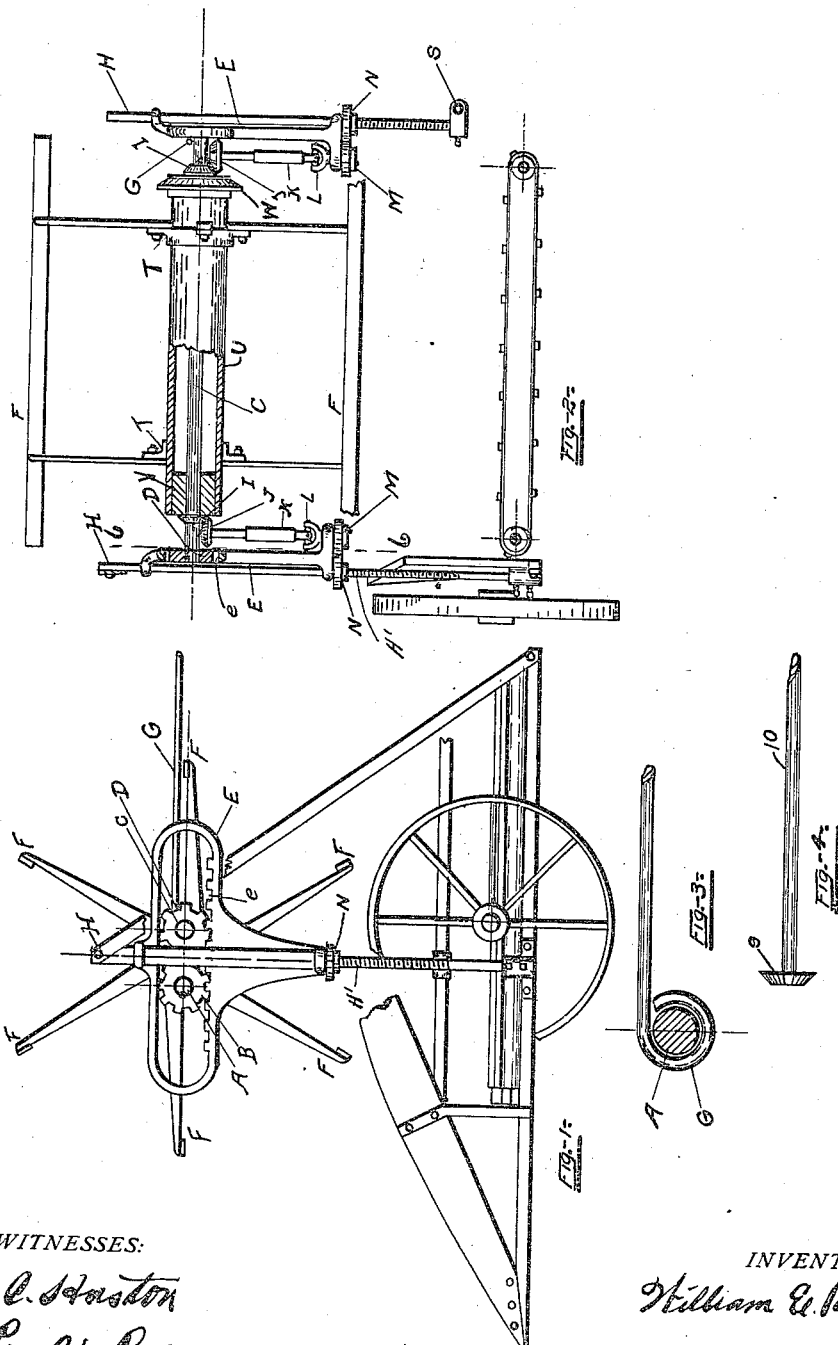
WITNESSES:
INVENTOR.
William E. Bennett W. E. BENNETT.
HARVESTER REEL AND SUPPORT THEREFOR.
APPLICATION FILED MAY 16, 1910.

1,013,636.

Patented Jan. 2, 1912.

2 SHEETS—SHEET 2.

Witnesses
A. R. Walton
J. Miller

Inventor
William E. Bennett
by Max A. Schmidt
Attorney

UNITED STATES PATENT OFFICE.

WILLIAM E. BENNETT, OF GRAND ISLAND, NEBRASKA.

HARVESTER-REEL AND SUPPORT THEREFOR.

1,013,636.  Specification of Letters Patent.  Patented Jan. 2, 1912.

Application filed May 16, 1910. Serial No. 561,775.

*To all whom it may concern:*

Be it known that I, WILLIAM E. BENNETT, a citizen of the United States, residing at Grand Island, in the county of Hall and the State of Nebraska, have invented certain new and useful Improvements in Harvester-Reels and Supports Therefor, of which the following is a specification.

This invention relates to harvester reels, and more particularly to the supporting means thereof, the object of the invention being to provide an improved structure which permits vertical and horizontal adjustment of the reel, the parts being arranged so that the reel will be held rigidly in adjusted position. This object is attained by the mechanism illustrated in the accompanying drawing forming a part of this specification, in which drawing—

Figure 5:
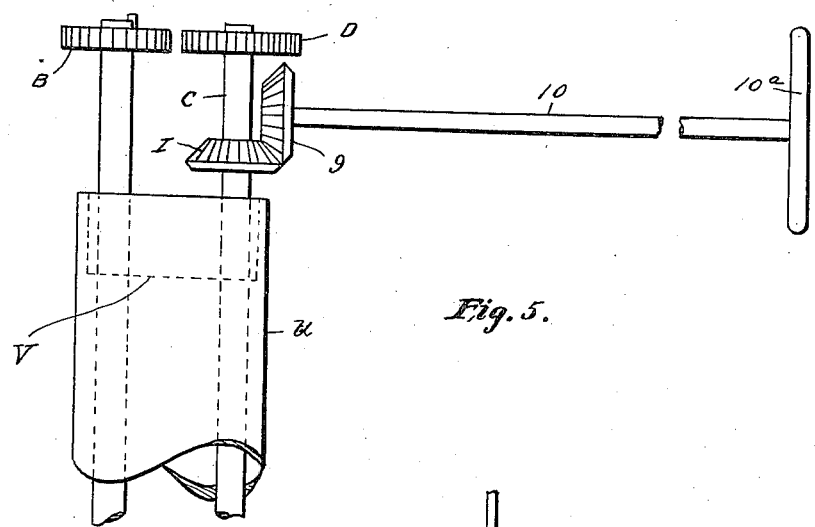
Figure 6:
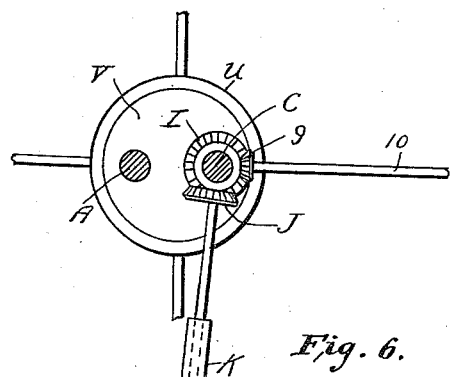
Figure 7:
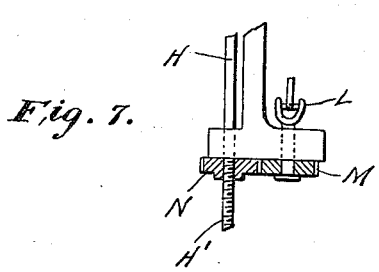

Figure 1 is an end view of a fragment of the machine showing the application of the invention. Fig. 2 is a front elevation partly in section. Fig. 3 shows the rod for effecting the horizontal adjustment of the reel. Fig. 4 shows the actuating means of the vertical adjustment. Fig. 5 is a plan view showing one end of the reel and parts carried thereby. Fig. 6 is a vertical section on the line 6—6 of Fig. 2. Fig. 7 is a sectional detail on the line 7—7 of Fig. 6.

Referring specifically to the drawing, F denotes the reel slats, they being carried at the extremities of radial arms which are carried by a hollow hub U. The arms are rigidly fastened to the hub by spiders T. In the ends of the hub are mounted bearing blocks V on which the hub rotates. These blocks are supported by two parallel shafts A and C which run through the hub longitudinally and pass loosely through the blocks and project suitable distances from the outer ends thereof. On each end of the shaft A is made fast a pinion B, and on each end of the shaft C is loosely mounted a pinion D. The reel is located between two similar yokes E which are formed with a horizontal rack $e$. The pinions on one side of the reel are in mesh with one of the racks, and the pinions on the other side of the reel are in mesh with the rack on that side of the reel. The members of the pairs of pinions are not in mesh with each other.

At the bottom of each yoke is a bearing in which is supported a short vertical shaft which carries a gear M. This shaft is connected by a universal joint L to a shaft K which extends upwardly and carries at its upper end a bevel gear J which is in mesh with a bevel gear I fast on the shaft C. Each yoke is slidably mounted on a vertical standard H, the lower end of which is screw-threaded as indicated at H'. The standards are supported in any suitable manner on the frame of the machine. The lower end of each yoke also carries a gear N which is in mesh with the gear M. The gear N is internally screw-threaded and is adapted to work up and down on the threaded portion H' of the standard H, similar to a nut.

It will be evident from the foregoing that the yokes are raised or lowered when the gears N are operated, said gears traveling downwardly on the standard when rotated in one direction, and upwardly when rotated in the other direction. The gearing is the same on both sides, in view of which the adjustment of the yokes will be parallel. The purpose of this adjustment is to raise and lower the reel. The gearing is operated by means of a hand-operated shaft 10 having at one end a bevel gear 9 which is in mesh with one of the gears I. The other end of the shaft extends close to the driver's seat and has a hand wheel 10ª. The motion of the gear 9 is transmitted to one of the gears I and through the shaft C is transmitted to the other gear I. The bevel gears J transmit the motion to the shafts K, and the gears M transmit the motion to the gears N. The shaft C is loose in the bearings V and the pinions D are loose on the shaft so that it is free to turn and transmit motion from one gear I to the other.

Horizontal adjustment of the reel is effected by a rod having an eye G through which one end of the shaft A passes. This rod also extends to the driver's seat. The shafts A and C support the bearing blocks V, and are in turn supported by the racks $e$ through the engagement of the pinions B and D therewith. The pinions B are fast on the shaft A, so that when the rod is operated to bring the reel forwardly or rearwardly, said pinions travel the same distance along the racks and thus uniformly move both ends of the reel, the latter being carried bodily forwardly or rearwardly.

It will be evident from the foregoing that the reel has a vertical as well as a horizontal adjustment. In order to accommodate the shafts K of the gearing which effects the vertical adjustment, to the different positions of the reel, the said shafts are made in two telescoping sections, and the universal joints L, as already described, are provided. The reel is driven by a suitable gearing from the axle of the machine, one end of the hub U of the reel being provided with a gear W which is in mesh with the drive gear.

I claim:

1. In a harvester, a reel, supporting means therefor, vertical standards on which said supporting means are slidably mounted, said standards having screw-threaded portions, nuts carried by the supporting means and mounted for travel on said screw-threaded portions of the standards, and means for operating the nuts.

2. In a harvester, a reel, vertical standards, yokes slidably mounted on the standards, means for adjusting the yokes on the standards, bearings for the reel, a shaft passing through the bearings, and supports for said shaft carried by the yokes and adjustable horizontally thereon.

3. In a harvester, vertical standards having screw-threaded portions, yokes slidably mounted on the standards, nuts carried by the yokes and mounted for travel on said screw-threaded portions of the standards, said nuts having gear teeth, a shaft supported by the yokes, a reel, bearings for the reel through which the shaft loosely passes, gearing between the aforesaid nuts and the shaft, and means for operating the shaft to actuate the gearing.

4. In a harvester, vertical standards having screw-threaded portions, yokes slidably mounted on the standards, nuts carried by the yokes and mounted for travel on said screw-threaded portions of the standards, said nuts having gear teeth, a shaft supported by the yokes and adjustable horizontally thereon, a reel, bearings for the reel through which the shaft loosely passes, gearing between the aforesaid nuts and the shaft, and means for operating the shaft to actuate the gearing.

5. In a harvester, vertical standards having screw-threaded portions, yokes slidably mounted on the standards, nuts carried by the yokes and mounted for travel on said screw-threaded portions of the standards, said nuts having gear teeth, a shaft supported by the yokes, a reel, bearings for the reel through which the shaft loosely passes, gears on the shaft, shafts having telescoping sections, gears on one of the shaft sections and in mesh with the first-mentioned gears, gears meshing with the aforesaid nuts, shafts for the last-mentioned gears carried by the yokes, and a universal joint between the last-mentioned shafts and the other sections of the sectional shafts.

6. In a harvester, vertical standards having screw-threaded portions, yokes slidably mounted on the standards, nuts carried by the yokes and mounted for travel on said screw-threaded portions of the standards, said nuts having gear teeth, horizontal racks on the yokes, a pair of gears engageable with the racks, shafts for said gears, one of the gears being fast on one shaft and the other loose on the other shaft, a reel, bearings for the reel through which the shafts loosely pass, gearing between the aforesaid nuts and the shaft of the loose gear, and means for operating said shaft.

WILLIAM E. BENNETT.

Witnesses:
 ROBERT J. DILL,
 S. C. HUSTON.

Copies of this patent may be obtained for five cents each, by addressing the "Commissioner of Patents, Washington, D. C."